May 20, 1958 C. KUSNERY 2,834,989
CONSTRUCTION OF EJECTOR SLEEVES
Filed April 7, 1954
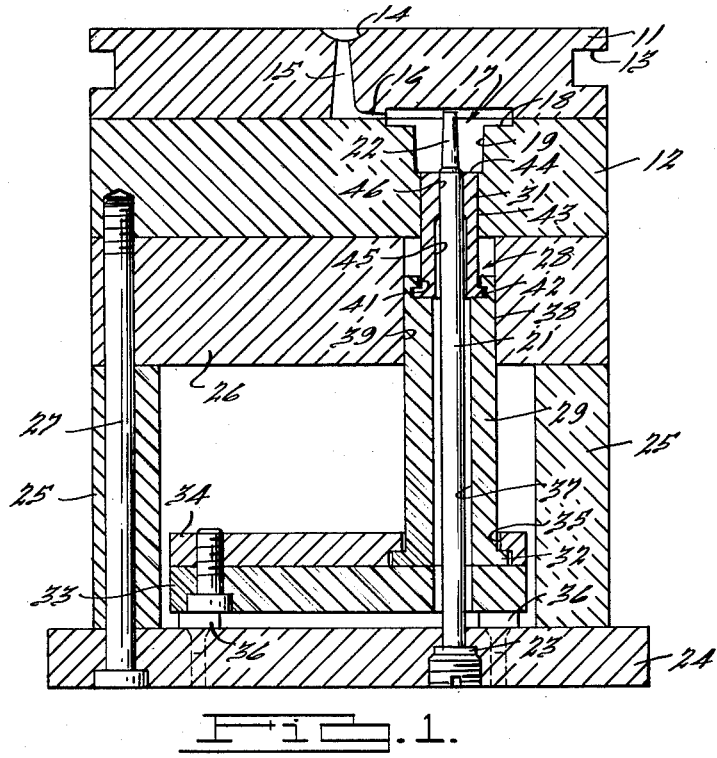
INVENTOR.
Charles Kusnery
BY
Harness, Dickey & Pierce
ATTORNEYS.

United States Patent Office 2,834,989
Patented May 20, 1958

2,834,989
CONSTRUCTION OF EJECTOR SLEEVES
Charles Kusnery, Hazel Park, Mich.

Application April 7, 1954, Serial No. 421,500

1 Claim. (Cl. 18—42)

This invention relates to plastic molding and die casting, and has particular reference to the construction of ejector sleeves used in such operations.

While the most common method for ejecting the molded part from its cavity is by use of ejector pins, there are frequent cases when ejector sleeves rather than pins must be used. A typical example is a molded article having a mounting boss or lug of small diameter, say ½", with a threaded hole in its center. A mold cavity for such an article would have a ½" diameter recess and a small core pin projecting from the bottom of the recess. The ejector sleeve in this case forms a bushing around the core at its base in the cavity and is moved by the ejector plate in the same manner as an ejector pin.

The use of such ejector sleeves creates problems of mold construction not found with ejector pins. To retain the core stationary inside the sleeve it is necessary to have it extend through the sleeve and through the ejector plate and held stationary in a clamping plate on the mold. The sleeve is subject to friction on both its outer and inner diameters when it moves, especially in the region of the cavity plate. This friction often becomes excessive, as in the case of die casting dies where the cavity steel often attains a temperature of 450–500° F. and is subject to intermittent expansion and contraction. At the same time, the sleeve must maintain a close fit so as not to allow the molten material to seep in around it. It is therefore customary to make sleeves of a high grade alloy steel, hardened and accurately ground. The portion of the sleeve held by the ejector plate must be allowed to float laterally due to differences in expansion between the cavity plate and ejector plate.

The conventional way of making ejector sleeves is to make them of one solid piece from the cavity plate to the ejector plate. This is a costly design in terms of machining and heat treating, inasmuch as a high grade steel is customarily used to obtain the proper hardness and heat resistance. The sleeves are sometimes made in lengths up to 18 or 20 inches for large molds and die casting dies. This means high replacement costs when the sleeves are damaged or worn out.

It is an object of the present invention to overcome the disadvantages of previously known ejector sleeve constructions, to avoid the problems enumerated above and to provide an improved ejector sleeve which is both inexpensive and efficient in use.

It is another object to provide an improved ejector sleeve construction a large portion of which can be made of low cost steel and which affords a substantial saving in machining costs.

It is also an object to provide an improved ejector sleeve construction as above described, which permits great versatility of sizes and makes it possible to stock sleeves for quick service in setting up molds.

It is a further object to provide an improved ejector sleeve construction of the above nature which facilitates self-alignment or lateral floating of the sleeve due to expansion of the mold.

It is also an object to provide an improved ejector sleeve construction having the above characteristics, which greatly lessens the replacement cost for a damaged or worn sleeve.

It is another object to provide an ejector sleeve construction as above described, which permits better control and more uniform hardness in the heat treating process.

Other objects, features, and advantages of the present invention will become apparent from the subsequent description, taken in conjunction with the accompanying drawings.

In the drawings:

Figure 1 is a cross-sectional view in elevation of a typical mold installation using the novel ejector sleeve construction of this invention;

Figure 2 is a side elevational view of the sleeve holder portion of the novel ejector sleeve construction;

Figure 3 is an end view of the sleeve holder showing the retaining slot for the sleeve;

Figure 4 is a side elevational view of the ejector sleeve portion of the construction; and Figure 5 is an end view of the ejector sleeve.

Referring more particularly to Figure 1, a typical mold setup is shown comprising cavity plates 11 and 12 having mating surfaces. Plate 11 is provided with a clamping slot 13 and a nozzle 14, sprue 15 and gate 16 in the usual manner. The gate is connected with a cavity generally indicated at 17 for the article to be molded. As shown, cavity 17 comprises a flange portion 18 formed by recesses in plates 11 and 12, and a boss or lug portion 19 formed as a recess in plate 12. A core pin 21 has a portion 22 extending centrally through recess 19 for forming a central hole in the molded article. The head 23 of core pin 21 is secured to a clamping plate 24 which in turn is rigidly connected to cavity plate 12 by means of support parallels 25, backup plate 26 and bolts 27. It will be seen that core pin 21 has no movement relative to cavity plate 12.

The novel ejector sleeve assembly of this invention is generally indicated at 28 and comprises an ejector sleeve holder 29 and an ejector sleeve 31. As is described in detail below, these parts act in unison to eject a molded article from cavity 17 after the molding operation is completed. Both sleeve holder 29 and sleeve 31 are concentric with core pin 21. Sleeve holder 29, which is substantially longer than sleeve 31, is of tubular shape and is preferably constructed of low cost material. In suitable instances, for example, holder 29 may be fabricated of standard seamless tubing. A head 32 is formed at one end of holder 29 and is held between an ejector plate 33 and a retainer plate 34. Plates 33 and 34 are of conventional construction and plate 34 is provided with a counterbored aperture 35 to receive holder 29. Aperture 35 is of slightly larger size than holder 29 to permit lateral floating of the holder. A pair of rest buttons 36 are provided on clamping plate 24 for limiting the retracting movement of the ejector plate assembly. This assembly may be advanced by the conventional ejector plate actuating means (not shown) when it is desired to eject the article from the mold cavity.

Holder 29 is provided with a passage 37 for core pin 21. It will be noted that this passage is of larger diameter than core pin 21 so that no friction will be created between these parts. The upper end of holder 29 has a surface 38 in sliding engagement with an aperture 39 in backup plate 26. An open T-slot 41 is provided at the upper end of holder 29 for retaining ejector sleeve 31. This sleeve is preferably fabricated of heat treated steel and has a head 42 removably held by slot 41. The slot is of larger diameter than head 42 to permit lateral floating of the ejector sleeve with respect to holder 29. The outer surface 43 of sleeve 31 has a sliding fit with cavity plate 12 to prevent seepage of material from the mold cavity. When the ejector plate assembly is in its retracted position, end surface 44 of sleeve 31 forms part of the mold cavity as seen in Figure 1. A major portion 45 of the inner aperture of sleeve 31 is enlarged to eliminate frictional contact with core pin 21. The outer end portion 46 of the inner aperture is slidably supported by core pin 21.

In operation, holder 29 and sleeve 31 are assembled by means of T-slot 41 in the holder. The parts are then assembled on core pin 21 and secured to ejector plate 33 by retainer plate 34. When the cavity plates 11 and 12 are brought together and the ejector assembly is retracted, material is forced into cavity 17 to form the article. During this time heating of cavity plate 12 will cause lateral shifting of ejector sleeve 31 with respect to holder 29, this shifting being permitted by T-slot 41. Aperture 35 permits additional lateral shifting of the entire ejector sleeve assembly if necessary. To eject the finished article after the cavity plates are separated, the ejector plate assembly is actuated to cause movement of sleeve 31 into the cavity, its end surface 44 ejecting the part. It will be noted that the area of frictional contact between ejector sleeve assembly 28 and core pin 21 is confined to surface 46 of sleeve 31, thus greatly reducing the effort required to move the ejector sleeve assembly.

Since sleeve holder 29 may be made of low cost seamless tubing its cost will be relatively cheap and the expense of machining the central aperture will be eliminated. Head 32 of holder 29 may be formed by hot forging, thus affording an additional saving of material. Since a few standard size lengths of holders may be kept on hand, it becomes financially practicable to stock different sizes of sleeves 31. These sleeves may have extra machining stock for grinding to the desired size after heat treatment. The relatively short size of sleeve 31 will permit better control during heat treating and more uniform hardness than the conventional type of ejector sleeve which has varying wall thicknesses and longer length. The shortness and light weight of sleeve 31 also permits easier self-alignment or lateral shifting due to expansion of the mold. The machining of ejector plate 33 and retainer plate 34 requires less accuracy, in terms of alignment with the cavity, than for conventional sleeves since lateral float is permitted between sleeve 31 and holder 29. Moreover, the small size of sleeve 31 makes it less expensive to replace when damaged or worn.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claim.

What is claimed is:

In a mold assembly of the type having a core pin, an ejector sleeve assembly comprising an ejector sleeve, the bore of said sleeve having a relatively small diameter adjacent the mold cavity and a relatively large diameter throughout its remaining extent, whereby the core pin will have a sliding fit with respect to the sleeve adjacent the mold cavity but will be permitted lateral movement with respect to the inner end of the sleeve, an outwardly extending annular shoulder at the inner end of said sleeve, a holder for said sleeve comprising a tubular member, the entire bore of said tubular member being of substantially larger diameter than said core pin, whereby relative lateral movement may take place between said core pin and holder, means for attaching the inner end of said holder to an ejector plate assembly, detachable connecting means between the outer end of said holder and said sleeve, said connecting means comprising an open-ended T-slot adjacent said outer end of the holder, said sleeve shoulder having a sliding fit with said T-slot to prevent relative axial movement between the sleeve and holder, the lateral dimensions of said T-slot being substantially larger than the diameter of said shoulder, and an apertured portion between said T-slot and the outer end of the holder, said apertured portion being of substantially larger diameter than said sleeve, whereby said detachable connecting means permits relative lateral movement between said sleeve and holder in any direction from a coaxial position.

References Cited in the file of this patent
UNITED STATES PATENTS

| | | |
|---|---|---|
| 1,695,001 | Wood | Dec. 11, 1928 |
| 1,766,265 | Smith | June 24, 1930 |
| 1,916,692 | Scribner | July 4, 1933 |
| 2,360,528 | Talmage | Oct. 17, 1944 |
| 2,362,048 | Cherry et al. | Nov. 7, 1944 |
| 2,378,586 | Schultz | June 19, 1945 |
| 2,640,325 | Haller | June 2, 1953 |